United States Patent [19]

Carpenter

[11] 3,818,931
[45] June 25, 1974

[54] WATER HAMMER ARRESTER

[76] Inventor: John J. Carpenter, 4054 Lockport Ave., North Tonawanda, N.Y. 14120

[22] Filed: June 8, 1972

[21] Appl. No.: 260,809

[52] U.S. Cl............... 137/374, 137/593, 285/156, 285/175
[51] Int. Cl............................................. F16l 3/00
[58] Field of Search............ 285/156, 155, 31, 175, 285/174; 137/593, 374; 138/26; 4/26

[56] References Cited
UNITED STATES PATENTS

| | | | |
|---|---|---|---|
| 508,566 | 11/1893 | Couse | 137/593 X |
| 803,358 | 10/1905 | Perry | 137/593 X |
| 953,967 | 4/1910 | Mueller | 137/593 |
| 2,100,404 | 11/1937 | Mason et al. | 138/26 |
| 2,505,303 | 4/1950 | Ronda | 285/155 |
| 2,992,020 | 7/1961 | Gulick | 285/174 X |

*Primary Examiner*—Dave W. Arola

[57] ABSTRACT

A water hammer arrester adapted for permanent installation on a water-consuming appliance, such as an automatic clothes washer or dishwasher, comprises a body portion which has a longitudinal bore therethrough and is provided with a female hose coupling at one end and an externally threaded portion at the other end for attachment to an appliance water inlet fitting and a water supply hose, respectively, and an elongated tubular portion that extends radially outwardly from said body portion, said tubular portion having a closed end providing an internal chamber communicating with said bore and adapted to trap air, whereby to provide a shock-absorbing air cushion therein.

3 Claims, 4 Drawing Figures

PATENTED JUN 25 1974　　3,818,931
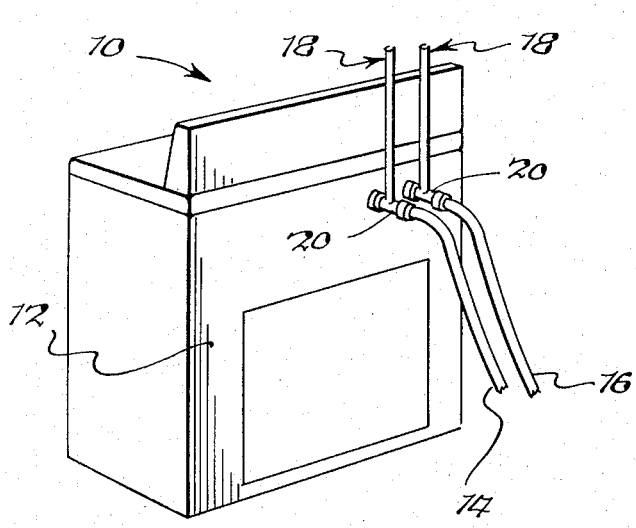
Fig. 1.
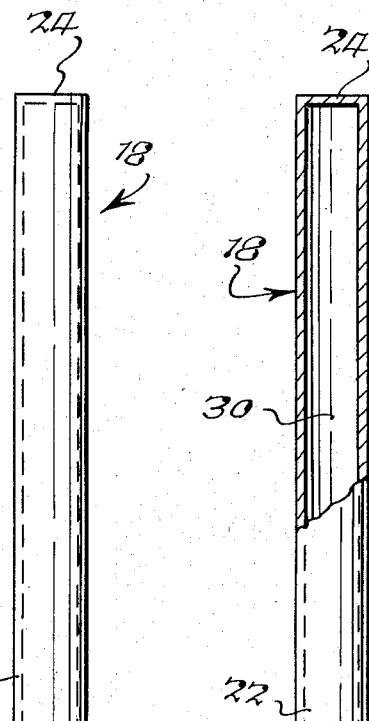
Fig. 2.
Fig. 3.
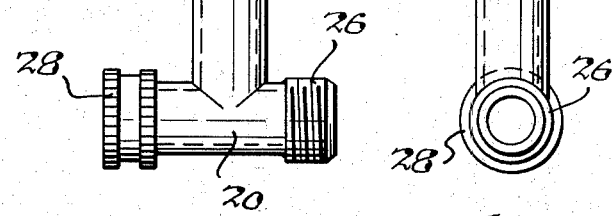
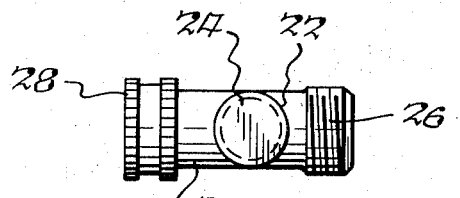
Fig. 4.

3,818,931

WATER HAMMER ARRESTER

BACKGROUND OF THE INVENTION

This invention relates to a water hammer arrester and, more particularly, to a water hammer arrester adapted to be mounted on household appliances such as automatic clothes washers, dishwashers, and the like. Water, like most liquids, is substantially incompressible under commonly used pressures. Consequently, when the flow of water under pressure in a piping system is suddenly interrupted, as for example, by the rapid closing of a valve, the abrupt increase of pressure occasioned by the stoppage of flow is transmitted through the incompressible water and, acting against the internal walls of the pipe or conduit, often creates a concussion similar to that of a hammer striking a pipe, which is commonly referred to as "water hammer."

In an effort to preclude water hammer, arresters incorporating air cushions are often installed in water systems, particularly in industrial water systems, and are generally located near the control valves. Such arresters, which are conventionally built from common piping components and fittings, such as tee fittings, threaded pipes, and end closure plugs or caps, are installed in the supply lines of the system and the services of a skilled pipe fitter or plumber are usually necessary for proper construction and installation.

Modern water-consuming appliances, such as automatic washers and dishwashers which are provided with electromagnetic actuators for substantially instantaneously opening or closing the water control valves therein in accordance with a programed operation, are especially conducive to the production of water hammer because of the rapidity with which the flow of water is interrupted when a valve is closed. Since water hammer is not only objectionable because of the noise produced, but also because the resultant vibration and stress may create maintenance problems, it is very desirable to provide means for minimizing or preventing it.

SUMMARY OF THE INVENTION

The apparatus of the present invention, as hereinafter described, provides a solution to the above-described problem with a prefabricated water hammer arrester, which is simple and strong in construction, low in cost, rugged and durable in use, and which is designed to be readily and permanently installed on a water-consuming appliance by an ordinary layman without tools.

Generally speaking, a water hammer arrester according to this invention comprises a tubular body portion having a longitudinal, substantially straight bore therethrough and a female hose coupling and an externally threaded portion on the ends thereof, for connection, respectively, to a water inlet fitting of a water-consuming appliance and to a water supply hose. An elongated tubular portion extends radially outwardly from said body portion and has a closed end, thereby providing a chamber which communicates through a port (not shown) with said bore and is adapted to trap air therein when installed in a vertical, upwardly projecting position on said appliance. The air under pressure in said chamber serves as an air cushion to absorb the energy when flow of water through the arrester is suddenly terminated, thus preventing concussion. Preferably, the arrester, except, of course, for the female hose coupling thereon, is formed in one piece as an integral unit.

BRIEF DESCRIPTION OF THE DRAWING

FIG. 1 is a perspective view of a water-consuming appliance, such as an automatic washing machine, having a water hammer arrester constructed in accordance with this invention mounted on each of the water inlet fittings of the machine;

FIG. 2 is a side elevational view, on an enlarged scale, of a water hammer arrester according to this invention;

FIG. 3 is a front elevational view, partly in section, of the water hammer arrester shown in FIG. 2; and FIG. 4 is a top plan view of the water hammer arrester shown in FIG. 2.

DETAILED DESCRIPTION OF A PREFERRED EMBODIMENT

Referring now in detail to the preferred embodiment depicted in the accompanying drawing, there is shown in FIG. 1, and comprehensively designated by the numeral 10, a water-consuming appliance, specifically, for illustration, a conventional automatic washer for clothes, which has projecting from the rear surface 12 thereof a pair of spaced apart, externally threaded, water inlet fittings to which there are customarily connected flexible water hoses, such as shown at 14 and 16. Through such hoses hot and cold water are supplied to the washer from supply pipes (not shown). Conventionally provided in each of the latter is a manual shut-off valve (not shown). As illustrated, a water hammer arrester, comprehensively designated 18, constructed in accordance with the present invention, is installed on each of the water inlet fittings on the back of the washing machine 10 and one of the water hoses is connected to each of the arresters.

The terms "upper," "lower," "top," "bottom," "right," "left" "above," "below," and similar terms of position and/or direction as used herein refer to the illustrations in FIGS. 1 – 3 but are used only for convenience in description or reference. Such terms should not be so construed as to alone imply a necessary positioning of the structure or portions thereof or to limit the scope of this invention.

As seen more clearly in FIGS. 2 – 4, inclusive, the water hammer arrester 18 of the present invention comprises a hollow body portion 20 having a substantially straight bore 22 extending therethrough, said bore being open at both ends. Extending laterally from the body portion 20 and, preferably in most cases, normal thereto is a tubular portion 22 which is preferably substantially longer than the body portion. The portion 22 is preferably formed integrally with the body portion, for example by casting, brazing, welding, or the like, between the ends thereof and has a closed outer end 24. The end 24 preferably forms an integral part of the tubular portion 22. The ends of the body portion 20 of the arrester 18 are provided with externally and internally threaded portions 26 and 28, respectively. The threads thereof are standard hose coupling threads and the threaded portion 28 is, in fact, a rotatable female hose coupling.

In order to install a water hammer arrester 18 on a water-consuming appliance such as the automatic washer 10, the coupling 28 of the arrester is threaded on one of the appliance water inlet fittings and tightened with the tubular portion 22 of the arrester directed upwardly in a substantially vertical position. A female coupling on the appropriate flexible water hose 14 or 16 is then fastened onto the externally threaded coupling portion 26 of the body portion 20 of the arrester. In making the connections, conventional hose washers may be employed if necessary to obtain tight, non-leaking joints. The same procedure is used for installing each arrester to be attached to an appliance. Ordinarily a separate arrester will be provided for each water inlet on the appliance.

A significant feature of the present invention is that the water hammer arrester 18 is of unitary construction and is ready for installation without the necessity of adding or installing any additional components, such as threaded pipes, nipples, pipe caps, or plugs as is required in providing conventional water hammer arresters. Moreover, the arrester 18 can be quickly installed by an ordinary layman, without the use of tools, except possibly a wrench to ensure tight connections.

When the arresters 18 have been installed on a water-consuming appliance and water under pressure has been admitted to the hoses 14 and 16 from suitable conduits (not shown), air in the air chambers 30 within the tubular portions 22 of the arresters will be trapped therein and placed under pressure, thus forming what may be termed pneumatic cushions which expand and contract in size in response to the varying pressure conditions in the water supply line of which it forms a part. It will be evident that even when the flow of water into the appliance is abruptly cut off by operation of a valve downstream from the arrester, for example an electromagnetically actuated valve in the appliance, the air trapped in the chamber 30 can be further compressed by the sudden increase in pressure in the line. Thus, the shock in the line is cushioned and water hammer is prevented. As stated above, the tubular portion 22 of the arrester is preferably substantially longer than the body portion 20. This is desirable since the volume of air trapped in the chamber 30 will be greater.

While the water hammer arresters of this invention are preferably formed of metal, it will be recognized that they can be formed of any suitable strong, rigid material, such as certain plastics for example, that will maintain the requisite strength under the pressure and temperature conditions to which they will be subjected in use.

It will be evident that the present invention provides a novel, simple and inexpensive water hammer arrester which can be readily and permanently installed on a water-consuming appliance, in effect becoming a part of the appliance, and which is easily coupled to or uncoupled from a water supply system. It will also be evident that the water hammer arrester of the present invention can be advantageously used in installations other than those described above.

A preferred embodiment of this invention having been hereinabove described and illustrated, it is to be understood that numerous modifications thereof can be made without departing from the broad spirit and scope of this invention as defined in the appended claims.

I claim:

1. A water hammer arrester comprising: a body portion having a substantially straight, unobstructed bore extending longitudinally therethrough; a tubular portion integral with and extending laterally from and substantially normal to said body portion, said tubular portion being substantially longer than said body portion and having an integral closed end whereby to provide a chamber; means providing communication between said chamber and said bore, said end being imperforate and immovably formed on said tubular portion; and means on the ends of said body portion for connection of said arrester to a water-consuming appliance and to a water conduit, respectively, said means comprising on one end of said body portion, a female hose coupling element, and on the other end of said body portion, external hose coupling threads.

2. A water hammer arrester as defined in claim 1 wherein said tubular portion is more than twice as long as said body portion.

3. A water-consuming household appliance such as an automatic clothes washer or dishwasher carrying a water inlet fitting, a water hammer arrester having a body portion including an inlet end and an outlet end, said outlet end being removably mounted directly on the inlet end of said fitting and said body portion having a substantially straight, unobstructed bore extending longitudinally therethrough between said ends, said arrester also comprising a tubular portion integral with said body portion and extending laterally and upwardly from said body portion between said ends, said tubular portion being substantially longer than said body portion and having an integral closed outer end whereby to provide a chamber, and having communication between said chamber and said bore, said outer end being imperforate and immovably formed on said tubular portion, and wherein said water-inlet fitting is adapted for coupling with a hose and said arrester is provided on the ends of said body portion, with, respectively, a female hose coupling and an externally threaded portion adapted for coupling with a female hose coupling.

* * * * *

UNITED STATES PATENT OFFICE
CERTIFICATE OF CORRECTION

Patent No. 3,818,931         Dated June 25, 1974

Inventor(s)    John J. Carpenter

It is certified that error appears in the above-identified patent and that said Letters Patent are hereby corrected as shown below:

Column 2, line 58, -- is imperforate and immovably formed on said tubular portion and -- has been inserted before "preferably".

Signed and sealed this 12th day of November 1974.

(SEAL)
Attest:

McCOY M. GIBSON JR.
Attesting Officer

C. MARSHALL DANN
Commissioner of Patents